United States Patent
Shijoh

(10) Patent No.: US 9,544,447 B2
(45) Date of Patent: Jan. 10, 2017

(54) INSPECTING DEVICE, METHOD FOR CHANGING THRESHOLD, AND COMPUTER-READABLE STORAGE MEDIUM

(71) Applicant: Takako Shijoh, Kanagawa (JP)

(72) Inventor: Takako Shijoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/935,260

(22) Filed: Nov. 6, 2015

(65) Prior Publication Data

US 2016/0142560 A1     May 19, 2016

(30) Foreign Application Priority Data

Nov. 14, 2014   (JP) ................................ 2014-232162
Jun. 15, 2015   (JP) ................................ 2015-120602

(51) Int. Cl.
    *H04N 1/00*           (2006.01)
    *G06K 15/02*          (2006.01)

(52) U.S. Cl.
    CPC ........ *H04N 1/00005* (2013.01); *G06K 15/025* (2013.01); *H04N 1/00063* (2013.01); *H04N 1/00087* (2013.01); *H04N 1/00328* (2013.01); *H04N 1/00811* (2013.01)

(58) Field of Classification Search
None
See application file for complete search history.

(56) References Cited

U.S. PATENT DOCUMENTS

| | | | | |
|---|---|---|---|---|
| 8,654,398 | B2* | 2/2014 | Dewancker | H04N 1/40 |
| | | | | 358/1.9 |
| 8,848,244 | B2* | 9/2014 | Kaneko | G06K 9/03 |
| | | | | 358/1.18 |
| 8,958,116 | B2* | 2/2015 | Tokumaru | H04N 1/00278 |
| | | | | 358/1.18 |
| 9,213,894 | B2* | 12/2015 | Yamagishi | H04N 1/00034 |
| 2014/0036290 | A1 | 2/2014 | Miyagawa et al. | |
| 2014/0079292 | A1* | 3/2014 | Kaneko | G06T 7/0002 |
| | | | | 382/112 |
| 2014/0079293 | A1 | 3/2014 | Kitai et al. | |

(Continued)

FOREIGN PATENT DOCUMENTS

| | | |
|---|---|---|
| JP | 2009-076009 | 4/2009 |
| JP | 4677718 | 2/2011 |

(Continued)

*Primary Examiner* — Paul F Payer
(74) *Attorney, Agent, or Firm* — Duft Bornsen & Fettig LLP

(57) ABSTRACT

An inspecting device includes a read image acquirer configured to acquire a first read image that is obtained by reading a printed matter; a reference image generator configured to generate a reference image based on a source image from which the printed matter has been generated; an inspector configured to inspect the printed matter based on threshold information containing one or more types of thresholds and based on a difference image indicating a difference between the first read image and the reference image; an identifier configured to identify, on the printed matter, an area having a discrepancy between an inspection result and a result of visual check by a user; and a changer configured to change the threshold information to resolve the discrepancy in the area.

9 Claims, 16 Drawing Sheets

(56) References Cited

U.S. PATENT DOCUMENTS

| | | | |
|---|---|---|---|
| 2014/0226177 A1* | 8/2014 | Shijoh | H04N 1/444 358/1.14 |
| 2014/0270397 A1* | 9/2014 | Sochi | G06T 7/001 382/112 |

FOREIGN PATENT DOCUMENTS

| | | |
|---|---|---|
| JP | 2014-199244 | 10/2014 |
| JP | 2014-200066 | 10/2014 |

\* cited by examiner

FIG.7
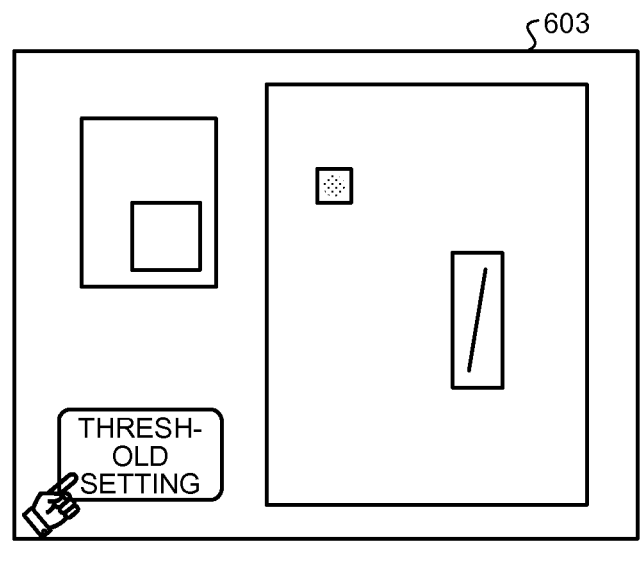
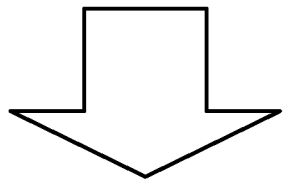
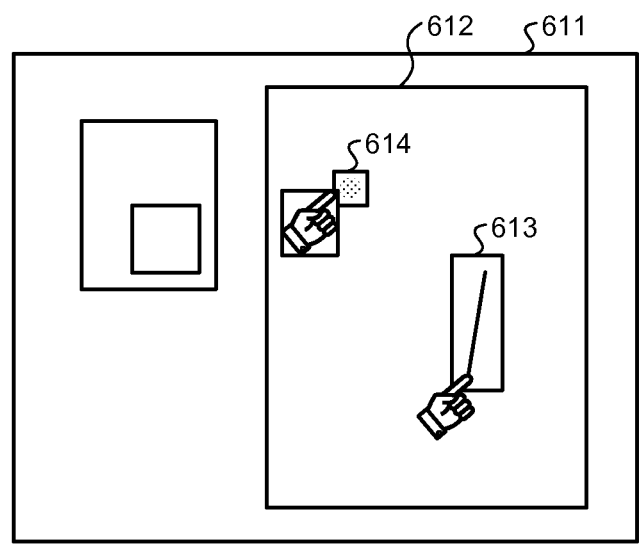

FIG.8
| SETTING ITEM | SETTING a | SETTING b |
|---|---|---|
| DIFFERENCE THRESHOLD | 20 | 20 |
| DOT AREA THRESHOLD | 20 | 5 |
| VERTICAL LINE AREA THRESHOLD | 10 | 2 |
| HORIZONTAL LINE AREA THRESHOLD | 10 | 2 |
| FIRST DENSITY AREA THRESHOLD | 10 | 2 |
| SECOND DENSITY AREA THRESHOLD | 100 | 50 |
| ⋮ | ⋮ | ⋮ |
801
FIG.9
| SETTING AREA | SET VALUE |
|---|---|
| BOUNDARY BETWEEN DOT AND LINE (LONG÷SHORT) | 2 |
| BOUNDARY BETWEEN HIGH-DENSITY PORTION AND LOW-DENSITY PORTION | 26 |
| ⋮ | ⋮ |
802
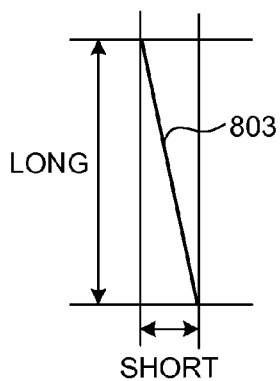
FIG.10
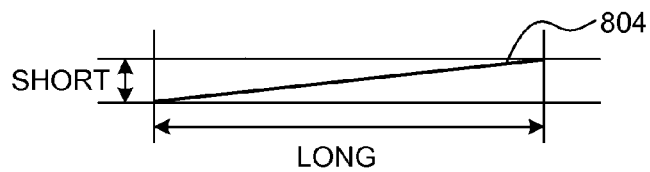
FIG.11

FIG.16

| | THUMBNAIL IMAGE | JOB NAME | PAGE | PAGE | |
|---|---|---|---|---|---|
| 1 | | Print Job2 | 2 | DEFECT ⇔ NON-DEFECT | 1101 / 1102 |
| 2 | | Print Job3 | 5 | DEFECT ⇔ NON-DEFECT | |
| ⋮ | ⋮ | ⋮ | ⋮ | ⋮ | |

FIG.17

| SETTING ITEM | SETTING a BEFORE CHANGE | SETTING a AFTER CAHGE | CHANGE OR NO-CHANGE |
|---|---|---|---|
| DIFFERENCE THRESHOLD | 20 | — | — |
| DOT AREA THRESHOLD | 20 | 20 | NOT CHANGED |
| VERTICAL LINE AREA THRESHOLD | 10 | 21 | APPLY |
| HORIZONTAL LINE AREA THRESHOLD | 10 | 10 | NOT CHANGED |
| FIRST DENSITY AREA THRESHOLD | 10 | 31 | APPLY |
| SECOND DENSITY AREA THRESHOLD | 100 | 100 | NOT CHANGED |
| ⋮ | ⋮ | ⋮ | ⋮ |

FIG.21

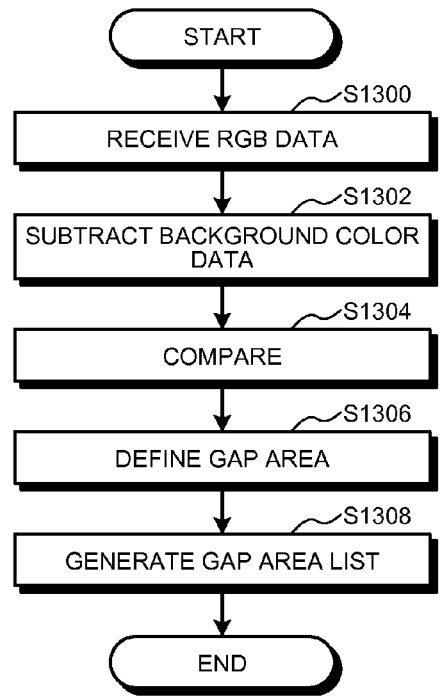

FIG.22

| PEN A | (R VALUE OF PEN A) | (G VALUE OF PEN A) | (B VALUE OF PEN A) | ATTRIBUTE A |
|---|---|---|---|---|
| PEN B | (R VALUE OF PEN B) | (G VALUE OF PEN B) | (B VALUE OF PEN B) | ATTRIBUTE B |
| ⋮ | ⋮ | ⋮ | ⋮ | ⋮ |

FIG.23

| 1 | ATTRIBUTE A | TOP X1 | TOP Y1 | BOTTOM X1 | BOTTOM Y1 | RIGHT-MOST X1 | RIGHT-MOST Y1 | LEFT-MOST X1 | LEFT-MOST Y1 |
|---|---|---|---|---|---|---|---|---|---|
| 2 | ATTRIBUTE A | TOP X2 | TOP Y2 | BOTTOM X2 | BOTTOM Y2 | RIGHT-MOST X2 | RIGHT-MOST Y2 | LEFT-MOST X2 | LEFT-MOST Y2 |
| 3 | ATTRIBUTE B | TOP X3 | TOP Y3 | BOTTOM X3 | BOTTOM Y3 | RIGHT-MOST X3 | RIGHT-MOST Y3 | LEFT-MOST X3 | LEFT-MOST Y3 |
| ⋮ | ⋮ | ⋮ | ⋮ | ⋮ | ⋮ | ⋮ | ⋮ | ⋮ | ⋮ |

INSPECTING DEVICE, METHOD FOR CHANGING THRESHOLD, AND COMPUTER-READABLE STORAGE MEDIUM

CROSS-REFERENCE TO RELATED APPLICATIONS

The present application claims priority to and incorporates by reference the entire contents of Japanese Patent Application No. 2014-232162 filed in Japan on Nov. 14, 2014 and Japanese Patent Application No. 2015-120602 filed in Japan on Jun. 15, 2015.

BACKGROUND OF THE INVENTION

1. Field of the Invention

The present invention relates to an inspecting device, a method for changing a threshold, and a computer-readable storage medium.

2. Description of the Related Art

Production printing requires that an inspection is performed on a printed matter generated by a printer. For example, an inspecting device reads a printed matter generated by a printer with a line sensor or the like of a camera or a scanner. Based on threshold information containing the result of the reading, and one or more types of thresholds, the inspecting device inspects whether the printing has been performed normally.

As an exemplary technique for changing threshold information described above, Japanese Patent No. 4677718 discloses a printed matter inspection control device that includes: a quality determining unit to detect a defect on an image on the basis of document image data and inspection image data and to classify quality of a printed matter into an acceptable class, an unacceptable class, or an intermediate class, which indicates intermediate quality between the acceptable class and the unacceptable class, on the basis of a plurality of thresholds; a storing unit to store therein log information containing information on the level of a defect on an image of a printed matter for each type of defect, and the information on the number of printed matters in each quality class; and a display unit to display the number of printed matters in each quality class. The display unit presents a display for allowing a user to change a threshold, and when a threshold is changed by a user, modifies the number of printed matters in each quality class according to the changed threshold and displays the modified number.

A conventional technique such as described above, however, requires technical knowledge for changing threshold information so as to obtain an inspection result intended by a user, which takes considerable effort.

Therefore, there is a need to provide an inspecting device, a method for changing a threshold, and a computer-readable storage medium that can easily change threshold information used for inspecting a printed matter to a value intended by a user.

SUMMARY OF THE INVENTION

It is an object of the present invention to at least partially solve the problems in the conventional technology.

According to an embodiment, there is provided an inspecting device that includes a read image acquirer configured to acquire a first read image that is obtained by reading a printed matter; a reference image generator configured to generate a reference image based on a source image from which the printed matter has been generated; an inspector configured to inspect the printed matter based on threshold information containing one or more types of thresholds and based on a difference image indicating a difference between the first read image and the reference image; an identifier configured to identify, on the printed matter, an area having a discrepancy between an inspection result and a result of visual check by a user; and a changer configured to change the threshold information to resolve the discrepancy in the area.

According to another embodiment, there is provided a method for changing a threshold. The method includes: acquiring a read image that is obtained by reading a printed matter; generating a reference image based on a source image from which the printed matter has been generated; inspecting the printed matter based on threshold information containing one or more types of thresholds and based on a difference image indicating a difference between the read image and the reference image; identifying, on the printed matter, an area having a discrepancy between an inspection result and a result of visual check by a user; and changing the threshold information to resolve the discrepancy in the area.

According to still another embodiment, there is provided a non-transitory computer-readable storage medium with an executable program stored thereon and executed by a computer. The program instructs the computer to perform: acquiring a read image that is obtained by reading a printed matter; generating a reference image based on a source image from which the printed matter has been generated; inspecting the printed matter based on threshold information containing one or more types of thresholds and based on a difference image indicating a difference between the read image and the reference image; identifying, on the printed matter, an area having a discrepancy between an inspection result and a result of visual check by a user; and changing the threshold information to resolve the discrepancy in the area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an explanatory diagram illustrating an exemplary method for specifying a gap area;

FIG. 8 is a table illustrating exemplary threshold information retained by the inspecting unit;

FIG. 9 is a table illustrating category-determining threshold information;

FIG. 10 is an explanatory diagram illustrating a method for determining a defect candidate of vertical line;

FIG. 11 is an explanatory diagram illustrating a method for determining a defect candidate of horizontal line;

FIG. 16 is a diagram illustrating an exemplary screen of information on affected areas;

FIG. 17 is a diagram illustrating an exemplary confirmation screen for changing threshold information;

FIG. 21 is a flowchart illustrating processing for identifying the gap area having the symbol marked with the pen;

FIG. 22 is a table illustrating an exemplary RGB data table;

FIG. 23 is a table illustrating a specific example of a gap area list;

DETAILED DESCRIPTION OF THE PREFERRED EMBODIMENTS

The following will describe embodiments of an inspecting device, a method for changing a threshold, and a computer program according to the present invention in detail with reference to the accompanying drawings.

First Embodiment

Figure 1:
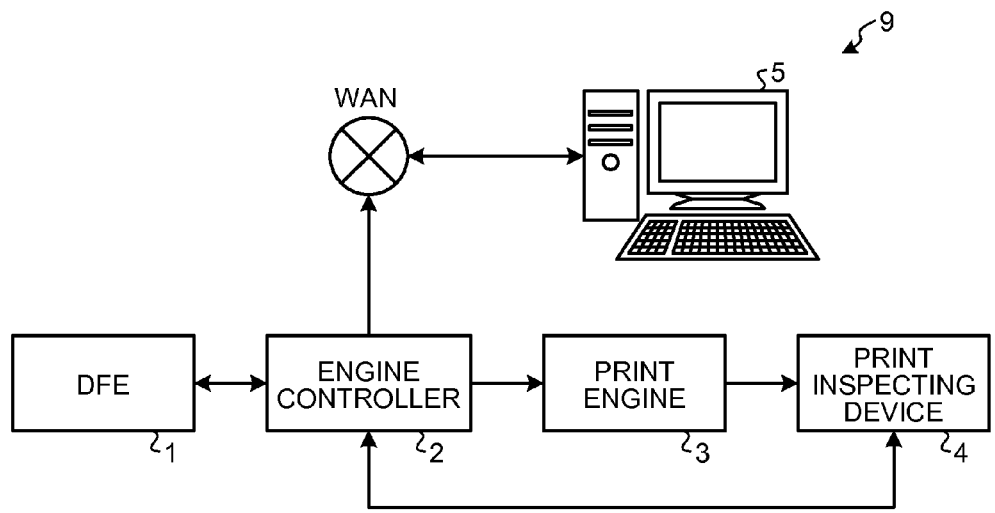
FIG. 1 is a block diagram illustrating a configuration of a print inspecting system.

FIG. 1 is a block diagram illustrating a configuration of a print inspecting system 9. As illustrated in FIG. 1, the print inspecting system 9 includes, for example, a digital front end (DFE) 1, an engine controller 2, a print engine 3, a print inspecting device 4 (an example of an inspecting device), and an information processing device 5.

The DFE 1 generates bitmap data (an example of a source image) to be printed and output on the basis of a received print job, and outputs the generated bitmap data to the engine controller 2.

The engine controller 2 controls the print engine 3 to execute image formation output on the basis of the bitmap data received from the DFE 1. The engine controller 2 transmits the bitmap data received from the DFE 1 to the print inspecting device 4.

The print engine 3 is an image forming apparatus that executes the image formation output on the basis of the bitmap data and generates a printed matter under the control of the engine controller 2.

The print inspecting device 4 generates a master image (an example of a reference image) on the basis of the bitmap data received from the engine controller 2, and compares the master image with a read image generated by electrically reading the printed matter that has been generated by the print engine 3, thereby inspecting the printed matter. The print inspecting device 4 then notifies the engine controller 2 of an inspection result such as information on a defective printed matter (e.g., information on a page of the printed matter). Thus, the engine controller 2 can execute control to reprint the defective printed matter.

The information processing device 5 communicates with the engine controller 2 via a network such as a wide area network (WAN). The information processing device 5 is a common information processing device such as a personal computer (PC). The information processing device 5 receives, for example, image information on a defective printed matter from the engine controller 2 according to an inspection result provided by the print inspecting device 4.

Figure 2:
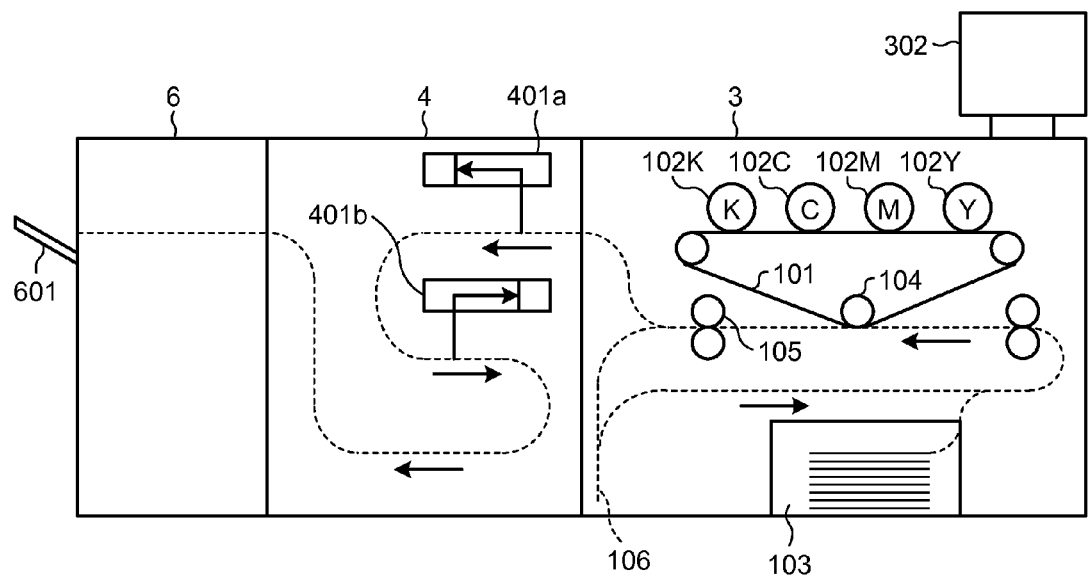
FIG. 2 is a diagram illustrating a mechanical configuration of a print engine and a print inspecting device.

FIG. 2 is a diagram illustrating a mechanical configuration of the print engine 3 and the print inspecting device 4. The print engine 3 includes photoconductor drums 102Y, 102M, 102C, and 102K of respective colors (hereinafter collectively referred to as photoconductor drums 102) disposed along a conveying belt 101 serving as an endless moving unit, and is what is called a tandem type engine. In other words, along the conveying belt 101, the photoconductor drums 102Y, 102M, 102C, and 102K are disposed in this order from the upstream side in a conveying direction of the conveying belt 101.

Images of respective colors developed with toner on the surfaces of the photoconductor drums 102 of respective colors are overlaid and transferred on the conveying belt 101, whereby a full-color intermediate transfer image is formed. The full-color intermediate transfer image thus formed on the conveying belt 101 is transferred onto a surface of a sheet conveyed from a paper feeding tray 103 through a sheet conveyance path, indicated by the dashed line in FIG. 2, by a function of a transfer roller 104 when the image is at a position closest to the path.

The sheet on which the image is formed is further conveyed, the image is fixed to the sheet by fixing rollers 105, and the sheet is conveyed to the print inspecting device 4. In the case of double-side printing, the sheet on one side of which the image has been formed and fixed is conveyed to a reverse path 106, and is reversed and conveyed to the transfer position of the transfer roller 104 again.

The print engine 3 includes an operation display unit 302 that is a user interface (UI) of the print engine 3.

Reading devices 401a and 401b disposed at the respective sides of the sheet surfaces, interposing the sheet conveying path in the print inspecting device 4, read the respective surfaces of the sheet conveyed from the print engine 3. The sheet the surfaces of which have been read by the reading devices 401a and 401b is further conveyed in the print inspecting device 4 to a stacker 6, and ejected to a paper ejection tray 601.

Figure 3:
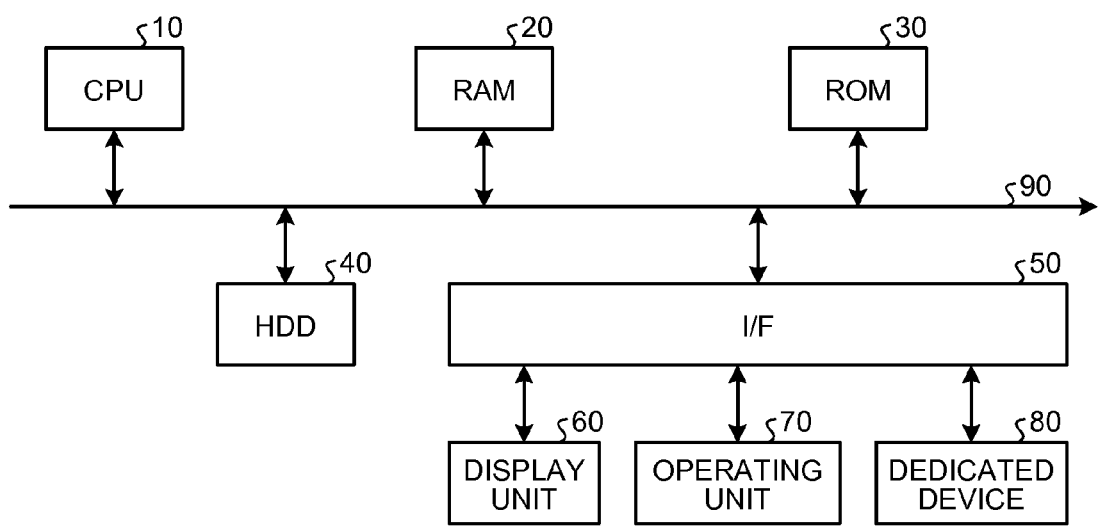
FIG. 3 is a block diagram illustrating an exemplary hardware configuration of the print inspecting device.

FIG. 3 is a block diagram illustrating an exemplary hardware configuration of the print inspecting device 4. The print inspecting device 4 has the same configuration as that of an information processing device such as a common PC or server. That is, the print inspecting device 4 includes a central processing unit (CPU) 10, a random access memory (RAM) 20, a read only memory (ROM) 30, a hard disk drive (HDD) 40, and an interface (I/F) 50 that are connected to each other via a bus 90. To the I/F 50, a display unit 60, an operating unit 70, and a dedicated device 80 are connected.

The CPU 10 is an arithmetic unit that controls the entire operation of the print inspecting device 4. The RAM 20 is a volatile storage medium that can read and write information at high speed, and is used as a working area when the CPU 10 processes the information. The ROM 30 is a read-only non-volatile storage medium and stores therein a computer program such as firmware.

The HDD 40 is a non-volatile storage medium that can read and write information, and stores therein an operating system (OS), various types of control programs, application programs, and the like. The I/F 50 connects the bus 90 with various types of hardware, a network, and the like to control them.

The display unit 60 is a visual user interface for a user to check the state of the print inspecting device 4. An example of the display unit 60 includes a liquid crystal display (LCD). The operating unit 70 is a user interface such as a keyboard or a mouse through which the user inputs information to the print inspecting device 4.

The dedicated device 80 is hardware for implementing a dedicated function. Examples of the dedicated device 80 include a dedicated arithmetic unit for performing image processing at high speed such as an application specific integrated circuit (ASIC), and a scanner device.

In such a hardware configuration, a computer program stored in the ROM 30, the HDD 40, or a storage medium such as an optical disc is loaded on the RAM 20, and the CPU 10 performs arithmetic operation according to the computer program, whereby a software control unit is implemented.

The engine controller 2 and the print engine 3 can also employ the hardware configuration illustrated in FIG. 3. For the print engine 3, examples of the dedicated device 80 include a conveying mechanism for conveying a sheet, and a plotter device. For the engine controller 2, an example of the dedicated device 80 includes a dedicated arithmetic unit for performing image processing at high speed such as an ASIC.

Figure 4:
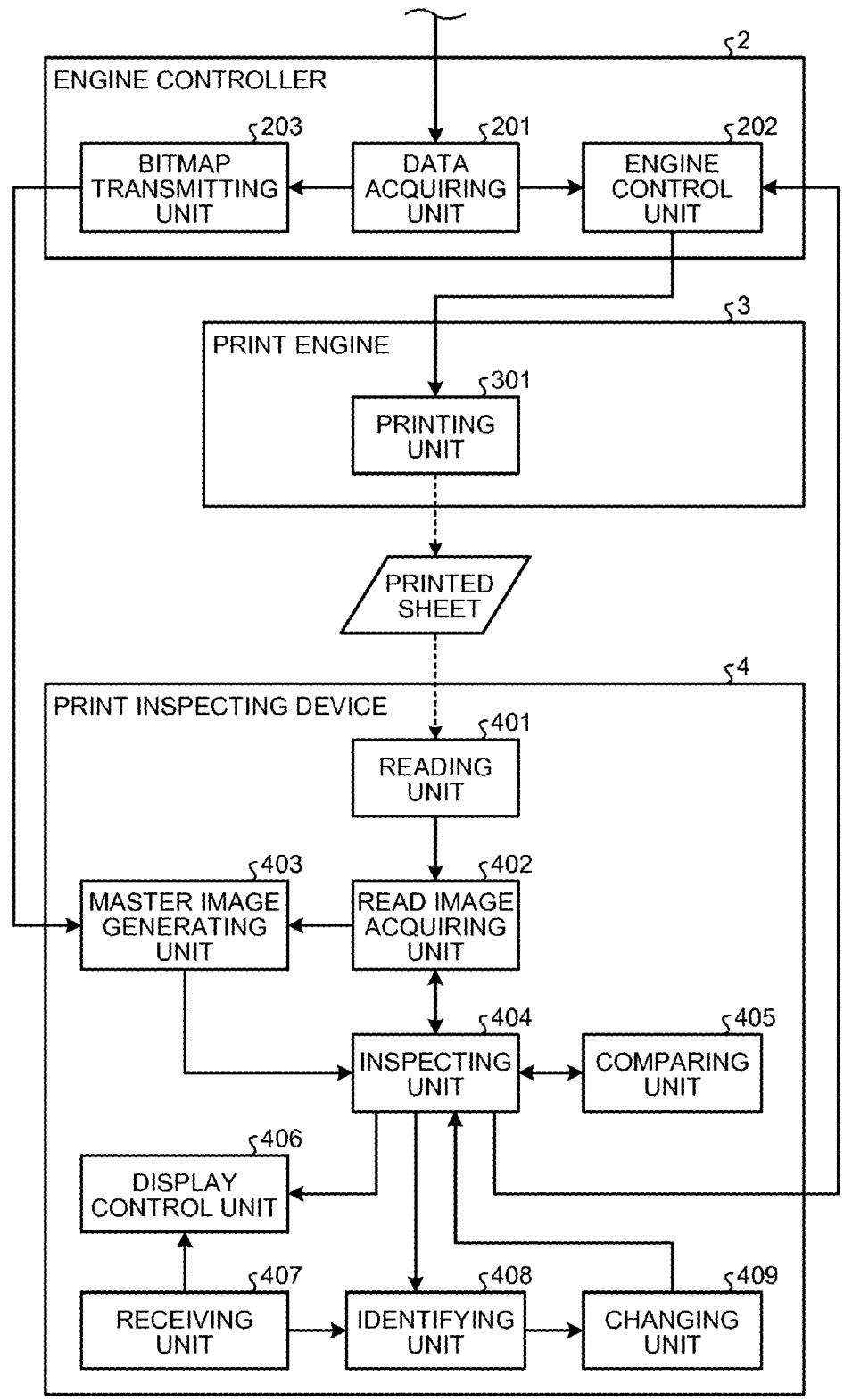
FIG. 4 is a block diagram illustrating an exemplary functional configuration of an engine controller, the print engine, and the print inspecting device.

FIG. 4 is a block diagram illustrating an exemplary functional configuration of the engine controller 2, the print engine 3, and the print inspecting device 4. In FIG. 4, the solid lines indicate transmission and reception of data, and the dashed lines indicate the flow of a sheet. Respective functions executed by the engine controller 2, the print engine 3, and the print inspecting device 4 may be implemented by hardware or software.

The engine controller 2 includes a data acquiring unit 201, an engine control unit 202, and a bitmap transmitting unit 203. The print engine 3 includes a printing unit 301. The print inspecting device 4 includes a reading unit 401, a read image acquiring unit 402, a master image generating unit 403 (an example of a reference image generating unit), an inspecting unit 404, a comparing unit 405, a display control unit 406, a receiving unit 407, an identifying unit 408, and a changing unit 409. The respective functions executed by the engine controller 2, the print engine 3, and the print inspecting device 4 may be implemented by hardware or software.

The data acquiring unit 201 acquires bitmap data that is input from the DFE 1, and causes each of the engine control unit 202 and the bitmap transmitting unit 203 to operate. The bitmap data is information on pixels constituting an image that is formed by image formation output. The engine control unit 202 causes the print engine 3 to execute image formation output on the basis of the bitmap data transmitted from the data acquiring unit 201. The bitmap transmitting unit 203 transmits the bitmap data acquired by the data acquiring unit 201 to the print inspecting device 4 to generate a master image.

The printing unit 301 acquires the bitmap data that is input from the engine controller 2, executes the image formation output on a sheet on the basis of the bitmap data, and generates and outputs a printed matter on which an image has been formed on the basis of the bitmap data. The printing unit 301 can be configured with, for example, the photoconductor drums 102, the conveying belt 101, the transfer roller 104, the fixing rollers 105, and other components. The printing unit 301 is implemented by a common electrophotographic type image forming mechanism. Alternatively, another image forming mechanism such as of inkjet type may be used.

The reading unit 401 reads the printed matter generated by the printing unit 301, and generates and outputs a read image. The reading unit 401 can be configured with, for example, the reading devices 401a and 401b and the dedicated device 80.

The read image acquiring unit 402 acquires the read image (an example of a first read image) read from the printed matter. Specifically, the read image acquiring unit 402 acquires the read image of the printed matter from the reading unit 401, and outputs the read image to the inspecting unit 404.

The master image generating unit 403 generates a reference image on the basis of a source image from which the printed matter has been generated. Specifically, the master image generating unit 403 receives the bitmap data from the engine controller 2, performs, on the bitmap data, various types of image processing such as multi-value conversion processing, smoothing processing, resolution conversion processing, and color conversion processing, and generates a master image.

The inspecting unit 404 inspects the printed matter on the basis of threshold information containing one or more types of thresholds, and a difference image indicating a difference between the read image acquired by the read image acquiring unit 402 and the master image generated by the master image generating unit 403.

Specifically, the inspecting unit 404 outputs, to the comparing unit 405, the read image acquired by the read image acquiring unit 402 and the master image generated by the master image generating unit 403. The comparing unit 405 compares corresponding pixels between the read image and the master image that have been input from the inspecting unit 404, calculates difference values between the pixel values of the corresponding pixels, generates a difference image including the difference values between the read image and the master image, and outputs the difference image to the inspecting unit 404. In the first embodiment, the read image and the master image are each images of 200 dpi represented by RGB colors each color having 8 bits; however, the images are not limited to this configuration. In the first embodiment, the comparing unit 405 is configured with, for example, the dedicated device 80 such as an ASIC for rapidly processing a vast amount of calculation; however, the comparing unit is not limited to this configuration.

The inspecting unit 404 calculates, for each certain area of the difference image that has been input from the comparing unit 405, a total value of the difference values of the pixels included in the certain area, compares the total value with a threshold for detecting a defect candidate area. If the total value is equal to or larger than the threshold for detecting a defect candidate area, the inspecting unit 404 determines the certain area to be a defect candidate area. A certain area may be an area of several dots square to several tens of dots square, or of one hundred and several tens of dots square, for example.

The following will explain the threshold information. An example of one or more types of thresholds contained in the threshold information includes an area threshold for determining, for each category of defect, whether a defect falls within the category of defect corresponding to the area threshold. The thresholds are, however, not limited to this example. Examples of the area threshold include a dot area threshold for determining whether an abnormal pixel group constituted of abnormal pixels is a dot defect, a horizontal line area threshold for determining whether an abnormal pixel group is a horizontal line defect, a vertical line area threshold for determining whether an abnormal pixel group is a vertical line defect, a first density area threshold for determining whether an abnormal pixel group is a first density defect due to high density, and a second density area threshold for determining whether an abnormal pixel group is a second density defect due to low density.

For the first embodiment, an explanation will be made on an exemplary case in which the one or more types of thresholds contained in the threshold information are: a difference threshold for determining whether pixels constituting a defect candidate area are abnormal pixels; the point area threshold; the horizontal line area threshold; the vertical line area threshold; the first density area threshold; and the second density area threshold. The thresholds are, however, not limited to this example. Note that the first embodiment assumes that the difference threshold is a fixed value, and thus the threshold information does not need to contain the difference threshold. In the first embodiment, the threshold information does not contain the above-described threshold for detecting a defect candidate area; however, the threshold information may contain the threshold for detecting a defect candidate area.

The inspecting unit 404 compares each of the pixels constituting the defect candidate area with the difference threshold and detects an abnormal pixel in the defect candidate area. The inspecting unit 404 counts, for each category of defect, the number of abnormal pixels constituting an abnormal pixel group that is a defect candidate in the corresponding category, and compares the counted number with the area threshold for a defect in the category. If the counted number of abnormal pixels is equal to or larger than the area threshold as a result of the comparison, the abnormal pixel group is determined to be a defect in the category, and the area on the read image corresponding to the defect candidate area is determined to be a defective area.

As described above, the inspecting unit 404 inspects the presence of a defect on the difference image, thereby inspecting the presence of a defect on the printed matter. Subsequently, the inspecting unit 404 transmits an inspection result to the engine controller 2.

The display control unit 406 causes the display unit 60 to display the inspection result transmitted from the inspecting unit 404. Examples of the inspection result from the inspecting unit 404 displayed on the display unit 60 include a thumbnail image of the read image and an enlarged image of a defective area on the read image; however, the inspection result is not limited to these examples. The display control unit 406 may cause the operation display unit 302 to display the inspection result from the inspecting unit 404.

The receiving unit 407 receives an input of an area on the printed matter, the area having a discrepancy between the inspection result from the inspecting unit 404 and a result of visual check by a user (hereinafter may be referred to as "gap area"). Specifically, the user checks for the presence of a gap area having a gap between the inspection result from the inspecting unit 404 displayed on the display unit 60 and the result of visual check on the printed matter by the user, that is, the presence of an area that is indicated as a defective area by the inspection result from the inspecting unit 404 but is determined to be a non-defective area as a result of the visual check, or an area that is indicated as a non-defective area by the inspection result from the inspecting unit 404 but is determined to be a defective area as a result of the visual check.

If a gap area is present, the user performs, through the operating unit 70, a specifying operation to specify the gap area on an enlarged image displayed on the display unit 60. The receiving unit 407 receives an input of the specifying operation. Thus, the receiving unit 407 receives the specifying operation to specify the gap area on the printed matter.

If the display control unit 406 causes the operation display unit 302 to display the inspection result from the inspecting unit 404, the user may perform the specifying operation through the operation display unit 302.

The identifying unit 408 identifies, on the printed matter, the area having a discrepancy between the inspection result from the inspecting unit 404 and the result of visual check by the user. Specifically, the identifying unit 408 identifies, on the read image, the gap area specified by the specifying operation on the basis of the specifying operation received by the receiving unit 407, thereby identifying the gap area on the printed matter.

The changing unit 409 changes the threshold information so as to resolve the discrepancy between the inspection result from the inspecting unit 404 and the result of visual check by the user, the discrepancy being on the area identified by the identifying unit 408. Specifically, when the inspection result from the inspecting unit 404 indicates that the gap area identified by the identifying unit 408 is a defective area, the changing unit 409 changes the threshold information so that the gap area is determined to be a non-defective area. In the same manner, when the inspection result from the inspecting unit 404 indicates that the gap area identified by the identifying unit 408 is a non-defective area, the changing unit 409 changes the threshold information so that the gap area is determined to be a defective area.

Subsequently, the inspecting unit 404 reinspects the printed matter on the basis of the threshold information changed by the changing unit 409 and the difference image generated by the comparing unit 405. The method for reinspecting the printed matter is the same as the above-described inspecting method except for the change in the threshold information.

The display control unit 406 causes the display unit 60 to display a reinspection result from the inspecting unit 404. The content of the reinspection result from the inspecting unit 404 may be the same as or different from that of the inspection result.

The following will explain specific operation of the print inspecting device 4.

Figure 5:
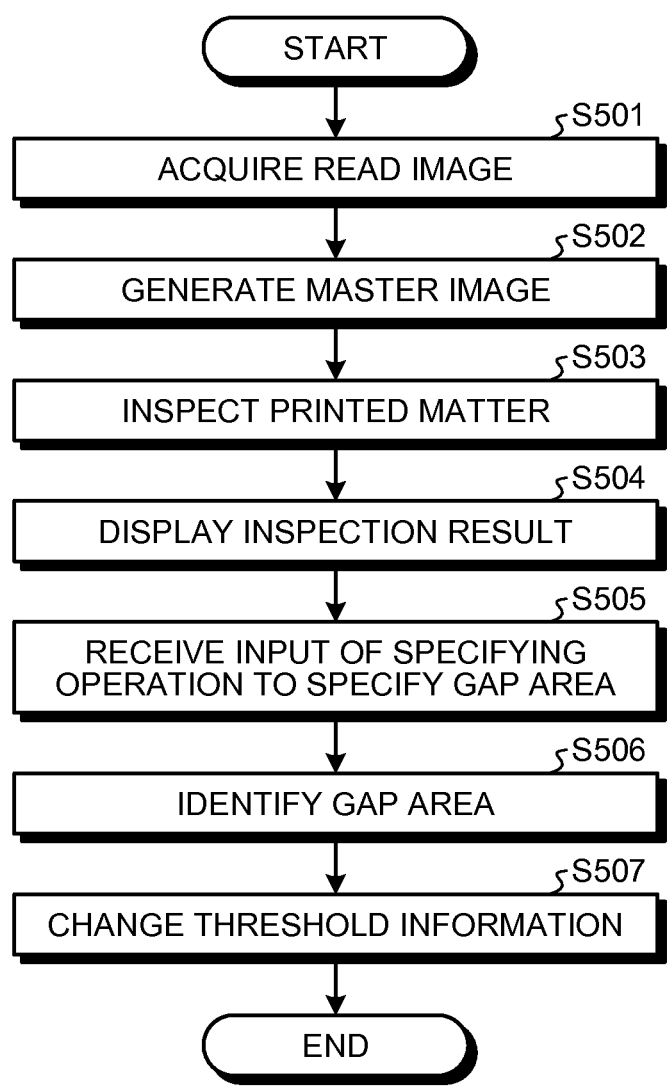
FIG. 5 is a flowchart illustrating exemplary processing by the print inspecting device.

FIG. 5 is a flowchart illustrating exemplary processing by the print inspecting device 4.

First, the read image acquiring unit 402 acquires a read image of a printed matter from the reading unit 401 (S501).

Next, the master image generating unit 403 generates a master image on the basis of a source image from which the printed matter has been generated (S502).

Next, the inspecting unit 404 inspects the printed matter on the basis of threshold information, and a difference image indicating a difference between the read image acquired by the read image acquiring unit 402 and the master image generated by the master image generating unit 403 (S503).

Next, the display control unit 406 causes the display unit 60 to display an inspection result from the inspecting unit 404 (S504).

Figure 6:
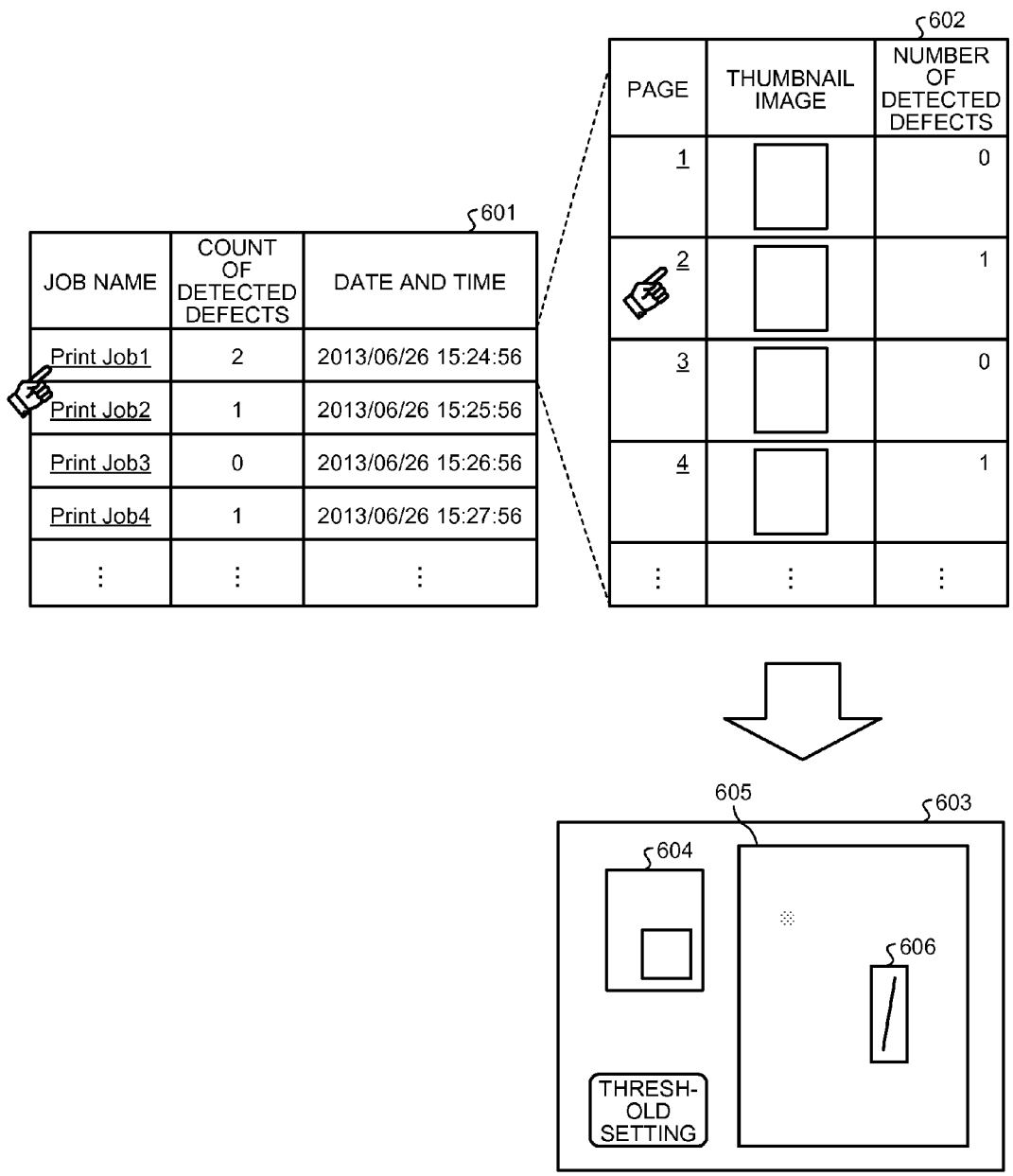
FIG. 6 is a diagram illustrating exemplary screens for an inspection result from an inspecting unit.

FIG. 6 is a diagram illustrating exemplary screens for an inspection result from the inspecting unit 404. In the example illustrated in FIG. 6, the display control unit 406 causes the display unit 60 to first display a job list screen 601 for an inspection result from the inspecting unit 404. The job list screen 601 contains job names, the counts of defects detected in the respective jobs, dates and times, and other items.

On the job list screen 601, a user performs a selecting operation to select a job through the operating unit 70. The receiving unit 407 receives the selecting operation and the display control unit 406 causes the display unit 60 to display a page list screen 602. The page list screen 602 contains pages, thumbnail images, the numbers of detected defects, and other items.

On the page list screen 602, the user performs a selecting operation to select a page through the operating unit 70. The receiving unit 407 receives the selecting operation and the display control unit 406 causes the display unit 60 to display a page screen 603. The page screen 603 contains a thumbnail image 604 of a read image, an enlarged image 605 of a defective area on the read image, and other items. The thumbnail image 604 displays a square indicating the area displayed as the enlarged image 605 to indicate the position of the enlarged image 605. The enlarged image 605 indicates the defective area in a rectangle 606.

The description returns to FIG. 5. Next, the receiving unit 407 receives, from the operating unit 70, an input of a specifying operation to specify a gap area on an enlarged image displayed on the display unit 60 (S505).

FIG. 7 is an explanatory diagram illustrating an exemplary method for specifying a gap area. When a user finds a gap area on the basis of the inspection result from the inspecting unit 404 displayed on the display unit 60 and of the result of visual check on the printed matter by the user, the user performs a pressing operation to press a threshold setting button on the page screen 603 illustrated in FIG. 6 through the operating unit 70. The receiving unit 407 receives the pressing operation and the display control unit 406 causes the display unit 60 to switch the page screen 603 for a viewing mode to the page screen 611 for a threshold setting mode and display the page screen 611.

An enlarged image 612 on the page screen 611 displays a region 613 and a square 614. The region 613 indicates a defective area, that is, an area indicated as a defective area by the inspection result from the inspecting unit 404. The square 614 is a non-defective area, for example, an area determined not to be a defective area although it is indicated as a defect candidate area by the inspection result from the inspecting unit 404. In the first embodiment, the square 614 indicates an area that is not indicated as a defective area by the inspection result from the inspecting unit 404, but will be determined to be a defective area if the inspecting unit 404 inspects the area using another threshold information containing a stricter value than that of the above-described threshold information. The square is, however, not limited to this example.

On the page screen 611, the region 613 and the square 614 can be selected. If the user determines, as a result of visual check, that the area indicated by the region 613 is a non-defective area and thus the area indicated by the region 613 is a gap area, the user performs a specifying operation to specify the region 613 as a gap area through the operating unit 70.

The receiving unit 407 receives the specifying operation. In the same manner, if the user determines, as a result of visual check, that the area indicated by the square 614 is a defective area and thus the area indicated by the square 614 is a gap area, the user performs a specifying operation to specify the square 614 as a gap area through the operating unit 70. The receiving unit 407 receives the specifying operation.

The description returns to FIG. 5. Next, the identifying unit 408 identifies, on the read image, the gap area specified by the specifying operation on the basis of the specifying operation received by the receiving unit 407, thereby identifying the gap area on the printed matter (S506).

Next, the changing unit 409 changes the threshold information so as to solve the gap in the gap area identified by the identifying unit 408 (S507).

FIG. 8 is a table illustrating exemplary threshold information retained by the inspecting unit 404. The inspecting unit 404 retains a plurality of types of threshold information. The example illustrated in FIG. 8 presents the types of threshold information in a threshold information table 801. The inspecting unit 404 retains the threshold information table 801 in a storage area on the HDD 40. In the example illustrated in FIG. 8, threshold information on a setting a and threshold information on a setting b are registered in the threshold information table 801.

The threshold information on the setting a and the threshold information on the setting b contains, as described above, the difference threshold, the dot area threshold, the horizontal line area threshold, the vertical line area threshold, the first density area threshold, and the second density area threshold. Each of the thresholds contained in the threshold information on the setting b is smaller than the corresponding threshold in the threshold information on the setting a. Thus, the threshold information on the setting b is stricter than that on the setting a. For the first embodiment, an explanation will be made on an exemplary case in which the threshold information on the setting a is used by the inspecting unit 404 to inspect the printed matter and the threshold information on the setting b is the other threshold information described in relation to FIG. 7. The pieces of threshold information are, however, not limited to this example.

The inspecting unit 404 retains, in a storage area on the HDD 40, category-determining threshold information for determining which category of defect candidate an abnormal pixel group in a defect candidate area falls within. FIG. 9 is a table illustrating category-determining threshold information 802. In the example illustrated in FIG. 9, the threshold for the boundary between a dot defect and a line defect is 2. In this case, if the result of dividing the long-side length of an abnormal pixel group by the short-side length of the abnormal pixel group is larger than 2, the abnormal pixel group is a defect candidate for a line defect. If the result is smaller than 2, the abnormal pixel group is a defect candidate for a dot defect. In the example illustrated in FIG. 9, the threshold for the boundary between a first density defect (high-density portion) and a second density defect (low-density portion) is 26.

Figure 12:
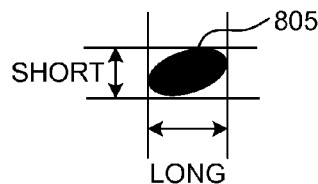
FIG. 12 is an explanatory diagram illustrating a method for determining a defect candidate for a dot defect.

In the cases of an abnormal pixel group 803 illustrated in FIG. 10 and an abnormal pixel group 804 illustrated in FIG. 11 for example, the result of dividing the long-side length by the short-side length is larger than 2, and thus the abnormal pixel group 803 and the abnormal pixel group 804 are defect candidates for line defects. The long-side direction of the abnormal pixel group 803 is the vertical direction, and thus the abnormal pixel group 803 is a defect candidate of vertical line. The long-side direction of the abnormal pixel group 804 is the horizontal direction, and thus the abnormal pixel group 804 is a defect candidate of horizontal line. In the case of an abnormal pixel group 805 illustrated in FIG. 12 for example, the result of dividing the long-side length by the short-side length is smaller than 2, and thus the abnormal pixel group 805 is a defect candidate for a dot defect. In the examples illustrated in FIGS. 10, 11, and 12, the vertical direction is a main-scanning direction and the horizontal direction is a sub-scanning direction.

Figure 13:
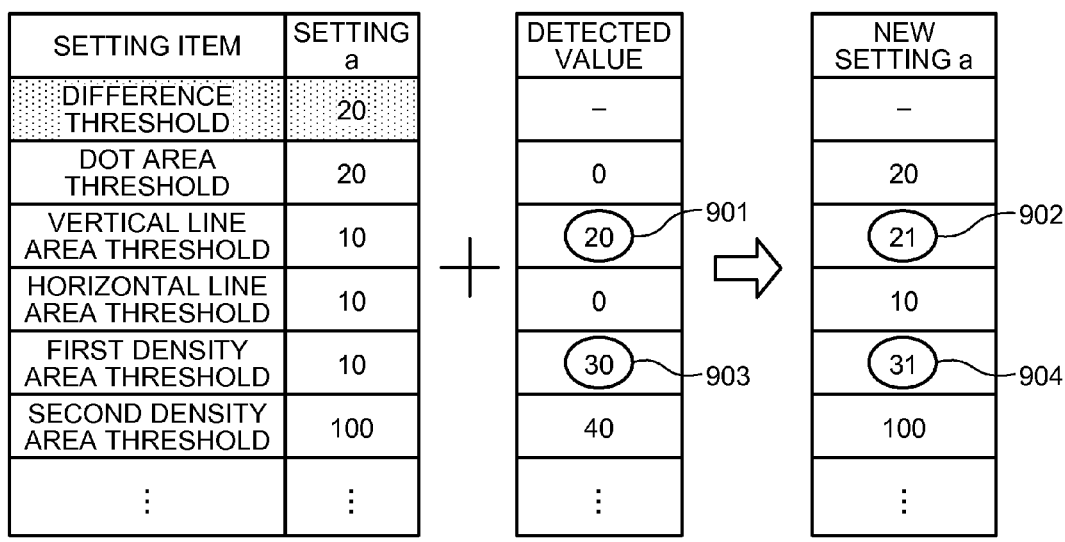
FIG. 13 is an explanatory diagram illustrating a method for changing threshold information so that a gap area indicated as a defective area is determined to be a non-defective area.

FIG. 13 is an explanatory diagram illustrating a method for changing threshold information so that a gap area indicated as a defective area is determined to be a non-defective area. In the example illustrated in FIG. 13, the changing unit 409 compares each of the area thresholds contained in the threshold information on the setting a with the corresponding detected value detected by an inspection performed by the inspecting unit 404, and changes the threshold information on the setting a. The detected value detected by the inspection performed by the inspecting unit 404 is the number of counted abnormal pixels as described above.

Specifically, as described above, the inspecting unit 404 compares each of the pixels constituting a defect candidate area with a difference threshold and detects an abnormal pixel in the defect candidate area, and counts, for each category of defect, the number of abnormal pixels constituting an abnormal pixel group that is a defect candidate in the corresponding category. The number of abnormal pixels counted for each category of defect is the detected value. The inspecting unit 404 uses the category-determining threshold information 802 to determine a possible category of candidate defect for an abnormal pixel group constituted of the abnormal pixels detected in the defect candidate area. As a result of the determination, the category within which no abnormal pixel group possibly falls has the number of counted abnormal pixels of 0.

The changing unit 409 compares each of the area thresholds contained in the threshold information on the setting a with the corresponding detected value detected by the inspection performed by the inspecting unit 404. If the area threshold > the detected value, the changing unit 409 does not change the area threshold. If the area threshold ≤ the detected value, the changing unit 409 changes the area threshold to a value obtained by adding 1 to the detected value.

In the example illustrated in FIG. 13, the detected value "20" (refer to numeral 901) corresponding to the vertical line area threshold is a value equal to or larger than the vertical line area threshold "10", and thus the changing unit 409 changes the vertical line area threshold to "21 (20+1)" (refer to numeral 902). In addition, the detected value "30" (refer to numeral 903) corresponding to the first density area threshold is a value equal to or larger than the first density area threshold "10", and thus the changing unit 409 changes the first density area threshold to "31 (30+1)" (refer to numeral 904). As a result, reinspection using the changed threshold information determines that all the area thresholds > the respective detected values, and thus the gap area is determined to be a non-defective area instead of a defective area.

Figure 14:
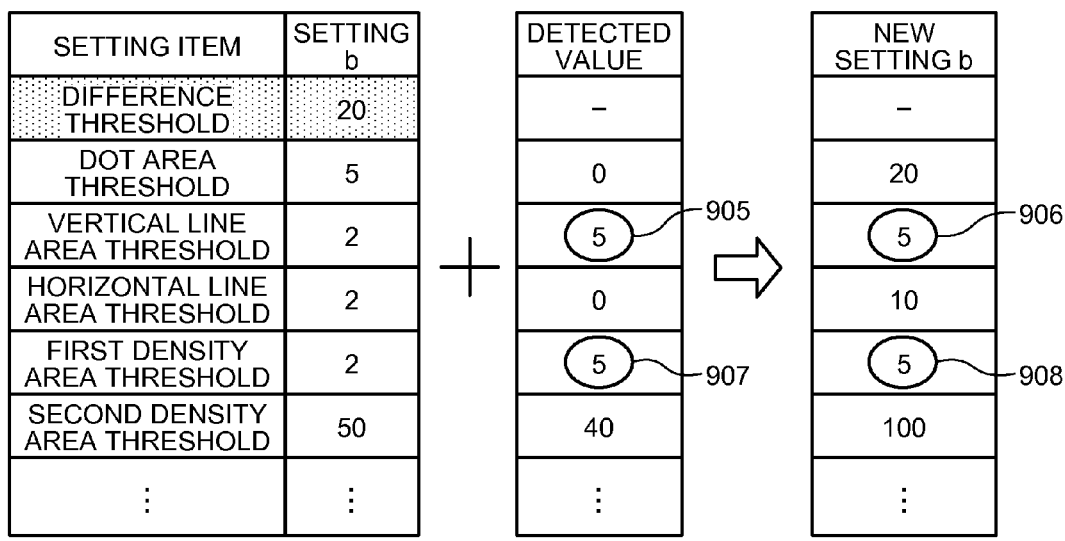
FIG. 14 is an explanatory diagram illustrating a method for changing threshold information so that a gap area indicated as a non-defective area is determined to be a defective area.

FIG. 14 is an explanatory diagram illustrating a method for changing threshold information so that a gap area indicated as a non-defective area is determined to be a defective area. In the example illustrated in FIG. 14, the changing unit 409 compares each of the area thresholds contained in the threshold information on the setting b with the corresponding detected value detected by an inspection performed by the inspecting unit 404, and changes the threshold information on the setting b. The detected value detected by the inspection performed by the inspecting unit 404 is the number of counted abnormal pixels as described above.

Specifically, the changing unit 409 compares each of the area thresholds contained in the threshold information on the setting b with the corresponding detected value detected by the inspection performed by the inspecting unit 404. If the area threshold ≥ the detected value, the changing unit 409 does not change the area threshold. If the area threshold < the detected value, the changing unit 409 changes the area threshold to the detected value.

In the example illustrated in FIG. 14, the detected value "5" (refer to numeral 905) corresponding to the vertical line area threshold is larger than the vertical line area threshold "2" in the setting b, and thus the changing unit 409 changes the vertical line area threshold in the setting b to "5" (refer to numeral 906). In addition, the detected value "5" (refer to numeral 907) corresponding to the first density area threshold is larger than the first density area threshold "2" in the setting b, and thus the changing unit 409 changes the first density area threshold in the setting a to "5" (refer to numeral 908). As a result, reinspection using the changed threshold information in the setting b determines, on the vertical line area threshold and the first density area threshold, that the area thresholds ≤ the respective detected values, and thus the gap area is determined to be a defective area instead of a non-defective area.

Figure 15:
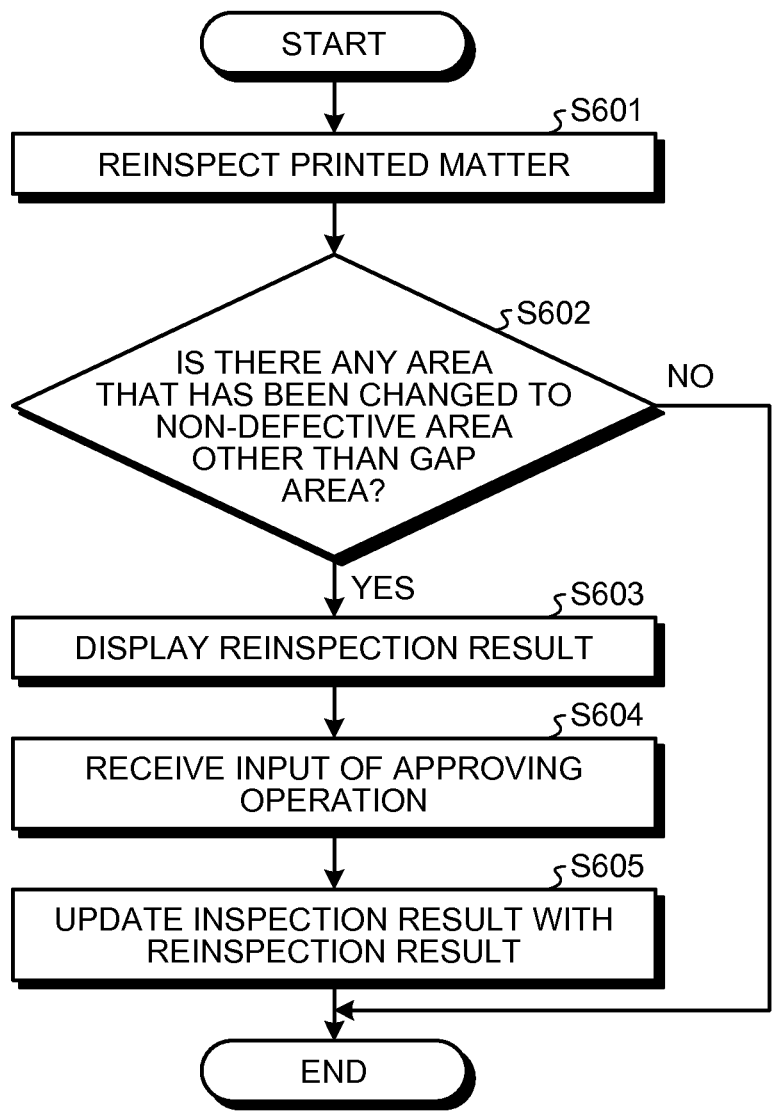
FIG. 15 is a flowchart illustrating exemplary processing by the print inspecting device after the processing illustrated in FIG. 5.

FIG. 15 is a flowchart illustrating exemplary processing by the print inspecting device 4 after the processing illustrated in FIG. 5. The flowchart illustrates the exemplary processing after S507 in the flowchart illustrated in FIG. 5 in which the threshold information is changed so that the gap area that is indicated as a defective area is determined to be a non-defective area.

First, the inspecting unit 404 reinspects the printed matter on the basis of the threshold information changed by the changing unit 409 and the difference image generated by the comparing unit 405 (S601).

Next, the inspecting unit 404 compares the inspection result and a reinspection result on the printed matter and checks for an affected area, which is an area that had been indicated as a defective area by the inspection result and has been changed to a non-defective area in the reinspection result, other than the gap area (S602).

If an affected area is present (Yes at S602), the display control unit 406 causes the display unit 60 to display information on the affected area as the reinspection result from the inspecting unit 404 (S603).

FIG. 16 is a diagram illustrating an exemplary screen of information on affected areas. An affected area screen 1101 illustrated in FIG. 16 contains thumbnail images, job names, page numbers, and check buttons 1102. Each check button 1102 includes "defect" and "non-defect". By checking the affected area screen 1101 illustrated in FIG. 16, a user can recognize the effect of the changed threshold information exerted on an area other than the gap area.

The description returns to FIG. 15. Next, for each affected area, if the user has no problem with determining the affected area to be a non-defective area, the user performs an approving operation to select "non-defect" on the corresponding check button 1102 through the operating unit 70. The receiving unit 407 receives an input of the approving operation from the operating unit 70 (S604).

Next, when the receiving unit 407 receives the input of the approving operation, the inspecting unit 404 updates the inspection result on the printed matter with the reinspection result (S605). This update deletes the information on the defective area corresponding to the affected area from the inspection result on the printed matter.

At S604, for each affected area, if the user has a problem with determining the affected area to be a non-defective area, the user performs a disapproving operation to select "defect" on the corresponding check button 1102 through the operating unit 70. The receiving unit 407 receives an input of the disapproving operation from the operating unit 70 (S604). When the receiving unit 407 receives the input of the disapproving operation, the inspecting unit 404 does not update the inspection result on the printed matter with the reinspection result.

The processing in the flowchart illustrated in FIG. 15 may be performed when the threshold information is changed at S507 in the flowchart illustrated in FIG. 5 so that the gap area that is indicated as a non-defective area is determined to be a defective area. In this case, an affected area is an area, other than the gap area, that had been indicated as a non-defective area by the inspection result and has been changed to a defective area in the reinspection result.

As described above, according to the first embodiment, threshold information is changed so as to solve a gap in a gap area, and thus can be easily changed to a value intended by a user. Furthermore, according to the first embodiment, a reinspection result obtained by using the changed threshold information is displayed, and thus the user can recognize the effect of the changed threshold information.

First Modification

The first embodiment may allow a user to select whether to apply the changed threshold information. In this case, the display control unit 406 causes the display unit 60 to display a confirmation screen for changing threshold information 1201 illustrated in FIG. 17. The confirmation screen for changing threshold information 1201 illustrated in FIG. 17 contains setting items (items of thresholds contained in the threshold information), values in the setting a before change, values in the setting a after change, and indication of change or no-change. The field of change or no-change for a setting item the value of which has been changed displays an "apply" button 1202. The user performs a pressing operation to press the "apply" button 1202 through the operating unit 70. The receiving unit 407 receives an input of the pressing operation from the operating unit 70, and the changing unit 409 completes the change in the threshold information.

Second Embodiment

For a second embodiment, an explanation will be made on an example of automatically identifying a gap area. The following will mainly describe differences from the first embodiment. The components having the same functions as those of the first embodiment are denoted by the same names and numerals, and the descriptions thereof are omitted.

Figure 18:
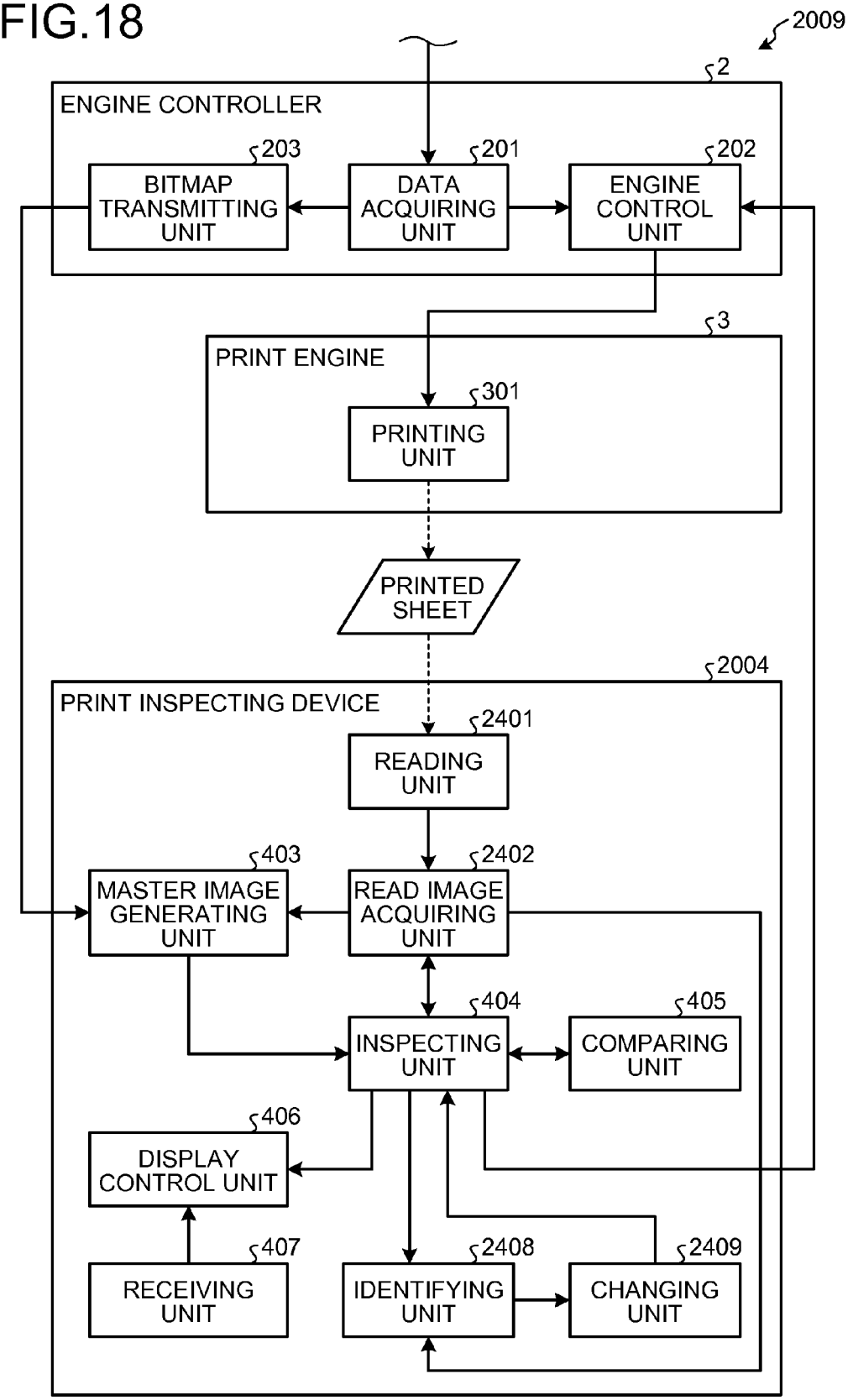
FIG. 18 is a block diagram illustrating an exemplary functional configuration of the engine controller, the print engine, and a print inspecting device.

FIG. 18 is a block diagram illustrating an exemplary functional configuration of the engine controller 2, the print engine 3, and a print inspecting device 2004 in a print inspecting system 2009. As illustrated in FIG. 18, a reading unit 2401, a read image acquiring unit 2402, an identifying unit 2408, and a changing unit 2409 are different from those of the first embodiment.

The reading unit 2401 reads a printed matter generated by the printing unit 301 and on which a user has specified an area having a discrepancy between an inspection result from the inspecting unit 404 and a result of visual check by the user, and generates and outputs a read image.

The read image acquiring unit 2402 acquires the read image (an example of a second read image, hereinafter referred to as "specified read image") generated by reading the printed matter on which the user has specified the area having a discrepancy between the inspection result from the inspecting unit 404 and the result of visual check by the user. Specifically, the read image acquiring unit 2402 acquires the specified read image of the printed matter from the reading unit 2401, and outputs the specified read image to the identifying unit 2408.

For example, in a state in which the receiving unit 407 has received an operation to set the threshold setting mode from the operating unit 70 and the print inspecting device 2004 is in the threshold setting mode, the reading unit 2401 is caused to read a printed matter on which a user has specified an area having a discrepancy between an inspection result from the inspecting unit 404 and a result of visual check by the user. The read image acquiring unit 2402 can be set to output a read image to the identifying unit 2408 while the print inspecting device 2004 is in the threshold setting mode, so as to output the specified read image to the identifying unit 2408 instead of the inspecting unit 404.

On the basis of the specified read image acquired by the read image acquiring unit 2402, the identifying unit 2408 identifies the area having a discrepancy between the inspection result from the inspecting unit 404 and the result of visual check by the user.

A gap area that is an area having a discrepancy between the inspection result from the inspecting unit 404 and the result of visual check by the user is specified with a symbol assigned to the printed matter. The identifying unit 2408 detects the symbol on the specified read image, and identifies the gap area on the basis of the symbol. The identifying unit 2408 identifies the gap area by an identifying method in accordance with the type of the detected symbol.

On the basis of the attribute of the symbol detected by the identifying unit 2408, the changing unit 2409 changes threshold information so as to resolve the discrepancy in the gap area between the inspection result from the inspecting unit 404 and the result of visual check by the user.

The following will describe specific methods for identifying a gap area.

First, the following will describe a method for identifying a gap area having a symbol marked with a pen.

Figure 19:
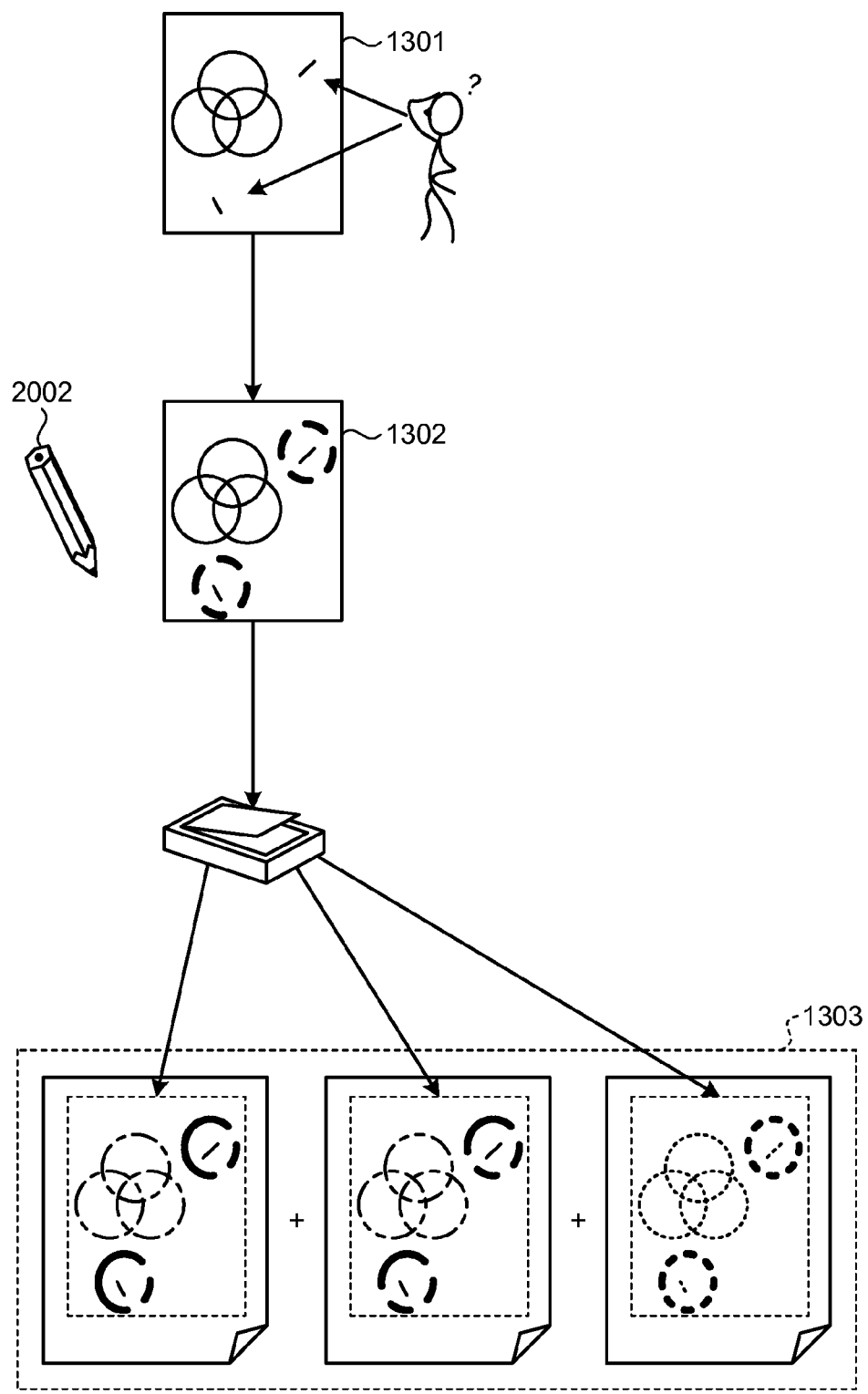
FIG. 19 is an explanatory diagram illustrating a method for specifying a gap area on a printed matter by a user placing a mark with a pen.

FIG. 19 is an explanatory diagram illustrating a method for specifying a gap area on a printed matter by a user placing a mark with a pen. A user finds a gap area on a printed matter (1301) and marks the gap area by circling it with a pen 2002 (1302). FIG. 19 illustrates an example of marking two gap areas on a printed matter with circles using the pen 2002 in a color such as blue. The reading unit 2401 reads the printed matter with symbols marked, and generates three pieces of bitmap data of R, G, and B (1303), and the read image acquiring unit 2402 acquires the pieces of bitmap data.

Figure 20:
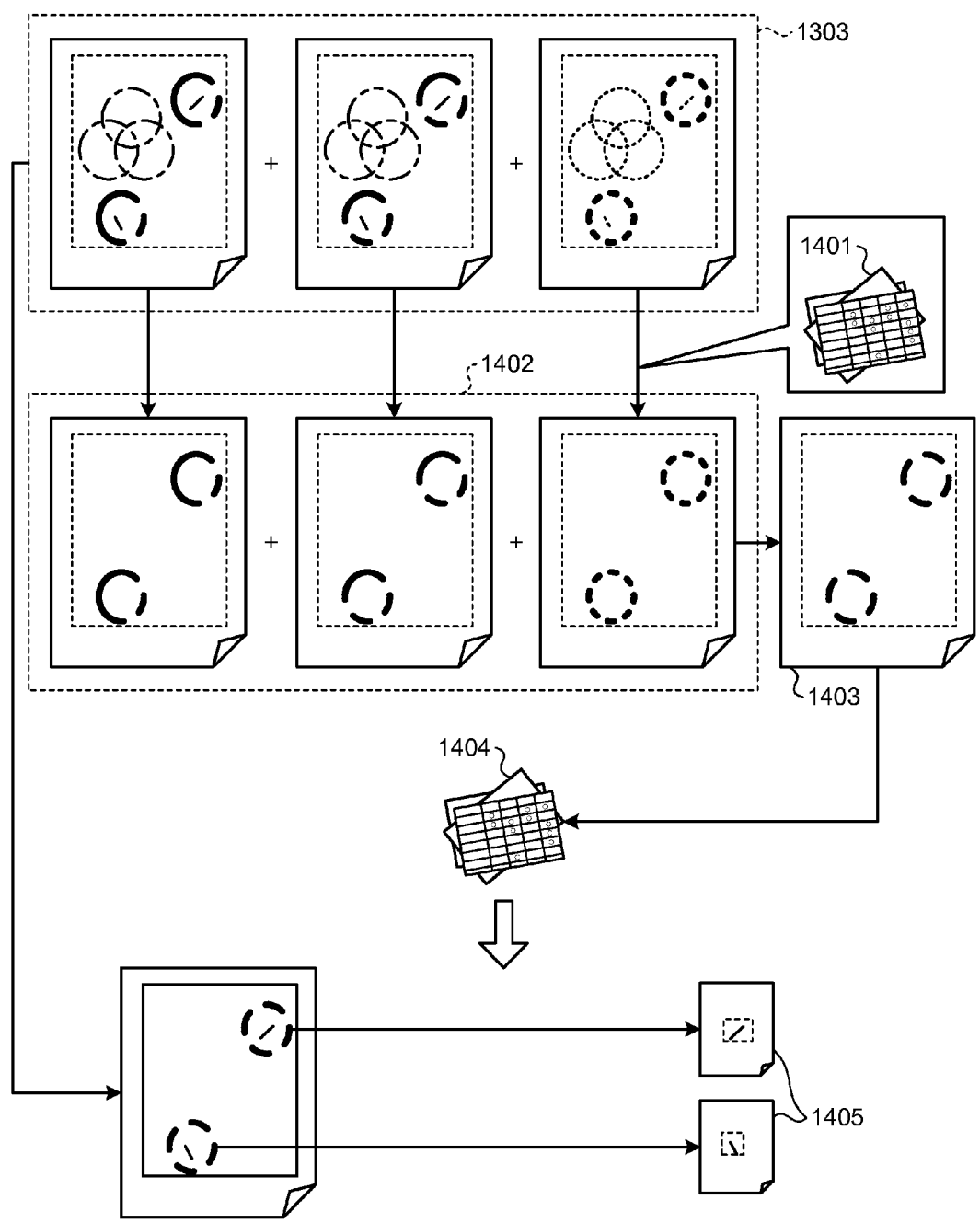
FIG. 20 is an explanatory diagram illustrating a method for identifying the gap area having the symbol marked with the pen.

FIG. 20 is an explanatory diagram illustrating a method for identifying the gap area having the symbol marked with the pen. FIG. 21 is a flowchart illustrating processing for identifying the gap area having the symbol marked with the pen.

At step 1300 (S1300), the identifying unit 2408 receives the three pieces of bitmap data of R, G, and B (hereinafter collectively referred to as "RGB data 1303") from the read image acquiring unit 2402.

At step 1302 (S1302), the identifying unit 2408 subtracts background color data of the printed matter (specifically, background color data of a sheet that is the printed matter) from the RGB data 1303 to remove the effect of the background color. The background color data of the printed matter is controlled by the engine controller 2 or other devices as sheet information, for example.

At step 1304 (S1304), the identifying unit 2408 compares the RGB data 1303 with RGB values of the pen 2002 registered in a preset RGB data table 1401 for pens. The identifying unit 2408 sets a flag on a pixel having a value approximate to the R value of the pen 2002 in the R data of the RGB data 1303, a flag on a pixel having a value approximate to the G value of the pen 2002 in the G data of the RGB data 1303, and a flag on a pixel having a value approximate to the B value of the pen 2002 in the B data of the RGB data 1303, thereby generating RGB data 1402.

FIG. 22 is a table illustrating an example of the RGB data table 1401. As illustrated in FIG. 22, the RGB data table 1401 indicates pen-specific IDs, RGB values of pens, and attributes. Here, an attribute indicates a threshold to be changed (any of the dot area threshold, the horizontal line area threshold, the vertical line area threshold, the first density area threshold, and the second density area threshold, for example) when thresholds to be changed are differentiated by the types of pens. Alternatively, if a user who has changed threshold information is to be identified by the type of a pen, an attribute indicates the user who uses (owns) the pen.

If a user uses, for marking, a plurality of types of pens registered in the RGB data table 1401, the identifying unit 2408 generates RGB data 1402 for each pen used by the user.

At step 1306 (S1306), the identifying unit 2408 identifies the pixels having the flags in all the R data, the G data, and the B data of the RGB data 1402, and defines an area enclosed by the pixels as a gap area (1403) on the printed matter.

At step 1308 (S1308), the identifying unit 2408 generates a gap area list 1404 including defined gap areas.

FIG. 23 is a table illustrating a specific example of the gap area list 1404. As illustrated in FIG. 23, the gap area list 1404 indicates attributes, and X and Y coordinates of the top portion, the bottom portion, the rightmost portion, and the leftmost portion of each mark with respect to a reference point. The reference point is at a position retained by the print inspecting device 2004.

The identifying unit 2408 identifies the position of each gap area 1405 in the RGB data 1303 by referencing the gap area list 1404. The changing unit 2409 changes the threshold information so as to solve the gap in the gap area on the basis of the attribute of the mark detected by the identifying unit 2408.

For example, if the attribute indicates a threshold to be changed, the changing unit 2409 changes the threshold to be changed indicated by the attribute. If the attribute indicates the user of a pen, the changing unit 2409 records a history by setting the user indicated by the attribute as the person who changes the threshold information.

Next, the following will describe a method for identifying a gap area having a symbol marked with a tag.

Figure 24:
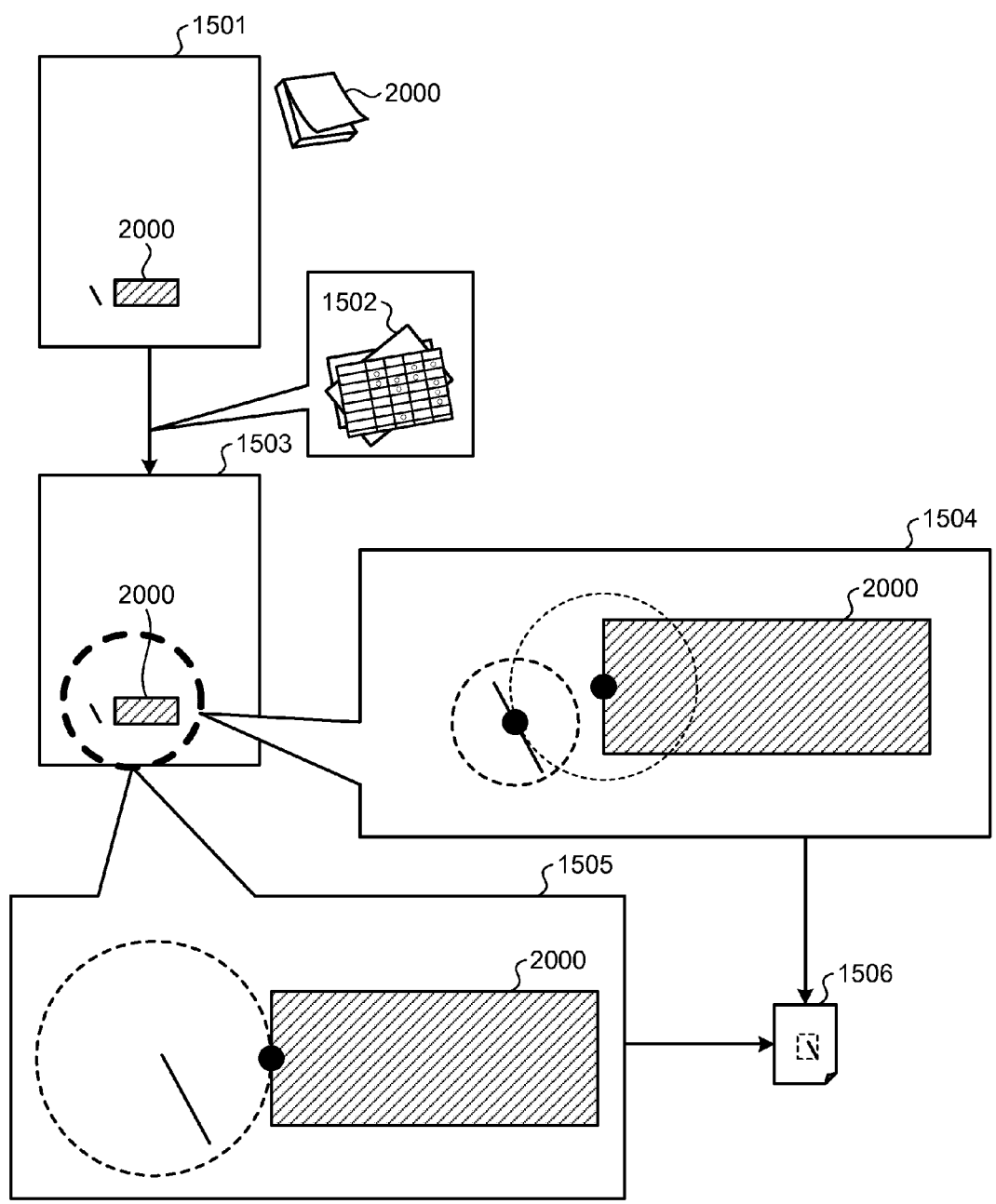
FIG. 24 is an explanatory diagram illustrating a method for identifying a gap area having a symbol marked with a tag.

FIG. 24 is an explanatory diagram illustrating a method for identifying a gap area having a symbol marked with a tag.

A user finds a gap area on a printed matter and marks the gap area by placing a tag 2000 in the vicinity of the gap area (1501).

Subsequently, the identifying unit 2408 refers to the RGB data of the tag 2000 and identifies the position of the mark (1503). The position of the mark can be identified by the same method as that used for identifying a symbol marked with a pen. In this case, however, a preset RGB data table 1502 for tags is used instead of the RGB data table 1401.

When a symbol is marked with a tag, simply identifying the position of the mark cannot identify the gap area, which is different from the case of a symbol marked with a pen. Thus, the identifying unit 2408 gradually enlarges a circle centering on a reference point of the tag. When the circle touches an abnormal pixel, the identifying unit 2408 sets the touched point as the center of a circle and enlarges the circle until a portion around which the circle is to be drawn ends (until the circle no longer touches an abnormal pixel) (1504), thereby identifying a gap area 1506. Alternatively, for example, the identifying unit 2408 gradually enlarges a circle centering on a reference point of the tag. After the circle touches an abnormal pixel, the identifying unit 2408 continues to enlarge the circle until a portion around which the circle is to be drawn ends (until the circle no longer touches an abnormal pixel) (1505), thereby identifying the gap area 1506. In either case, the reference point of the tag is fixed to the middle of the left side of the tag; however, the reference point is not limited to this example.

Next, the following will describe a method for identifying a gap area having a symbol marked with a tag and a pen. When a tag is used alone and a part of the tag is outside the sheet, the gap area may be identified as being outside the area of the printed matter. This method is used to prevent such out-of-area identification.

Figure 25:
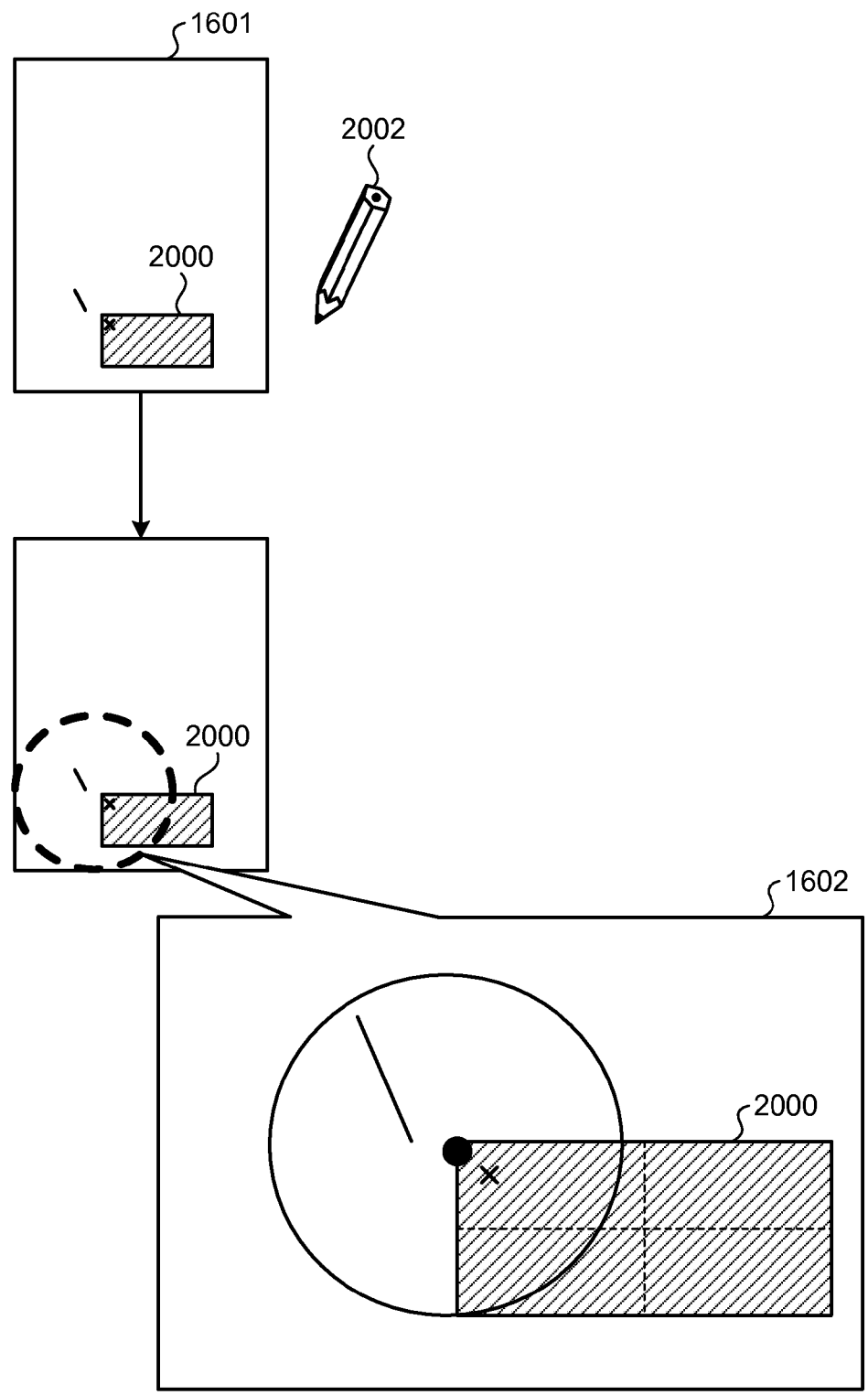
FIG. 25 is an explanatory diagram illustrating a method for identifying a gap area having a symbol marked with a tag and a pen.

FIG. 25 is an explanatory diagram illustrating a method for identifying a gap area having a symbol marked with a tag and a pen.

A user finds a gap area on a printed matter and marks the gap area by placing the tag 2000 in the vicinity of the gap area. In addition, the user places a mark with the pen 2002 at a corner of the tag 2000 adjacent to the gap area (1601).

The position of the mark placed with the tag can be identified by the same method as that used for identifying a symbol marked with a tag. The position of the mark placed with a pen can be identified by the same method as that used for identifying a symbol marked with a pen. The identifying unit 2408 identifies the gap area by the above-described method using, as a reference point, a corner of the tag 2000 that is close to the mark placed with the pen (1602).

According to an embodiment, it provides an advantageous effect of easily changing threshold information used for inspecting a printed matter to a value intended by a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inspecting device comprising:
   a read image acquirer configured to acquire a first read image that is obtained by reading a printed matter;

a reference image generator configured to generate a reference image based on a source image from which the printed matter has been generated;

an inspector configured to inspect the printed matter based on threshold information containing one or more types of thresholds and based on a difference image indicating a difference between the first read image and the reference image;

an identifier configured to identify, on the printed matter, an area having a discrepancy between an inspection result and a result of visual check by a user; and a changer configured to change the threshold information to resolve the discrepancy in the area, wherein the read image acquirer further acquires a second read image that is obtained by reading the printed matter on which the area is specified, the identifier identifies the area based on the second read image, the area is specified by a symbol assigned to the printed matter, and the identifier detects the symbol on the second read image and identifies the area based on the symbol.

2. The inspecting device according to claim 1, further comprising:

a receiver configured to receive a specifying operation to specify the area, wherein the identifier identifies the area based on the specifying operation.

3. The inspecting device according to claim 1, wherein the identifier identifies the area by an identifying method for a type of the symbol.

4. The inspecting device according to claim 1, wherein the changer changes, based on an attribute of the symbol, the threshold information to resolve the discrepancy of the inspection result in the area.

5. The inspecting device according to claim 1, wherein, when the inspection result indicates that the area is a defective area, the changer changes the threshold information so that the area is determined to be a non-defective area.

6. The inspecting device according to claim 1, wherein, when the inspection result indicates that the area is a non-defective area, the changer changes the threshold information so that the area is determined to be a defective area.

7. The inspecting device according to claim 1, wherein the inspector reinspects the printed matter based on the changed threshold information and the difference image, and the inspecting device further comprises a display controller configured to cause a display to display a reinspection result.

8. A method for changing a threshold, comprising:

acquiring a read image that is obtained by reading a printed matter;

generating a reference image based on a source image from which the printed matter has been generated;

inspecting the printed matter based on threshold information containing one or more types of thresholds and based on a difference image indicating a difference between the read image and the reference image;

identifying, on the printed matter, an area having a discrepancy between an inspection result and a result of visual check by a user, by:

acquiring a second read image that is obtained by reading the printed matter on which the area is specified;

identifying the area based on the second read image, wherein the area is specified by a symbol assigned to the printed matter; and detecting the symbol on the second read image and identifying the area based on the symbol; and changing the threshold information to resolve the discrepancy in the area.

9. A non-transitory computer-readable storage medium with an executable program stored thereon and executed by a computer, wherein the program instructs the computer to perform:

acquiring a read image that is obtained by reading a printed matter;

generating a reference image based on a source image from which the printed matter has been generated;

inspecting the printed matter based on threshold information containing one or more types of thresholds and based on a difference image indicating a difference between the read image and the reference image;

identifying, on the printed matter, an area having a discrepancy between an inspection result and a result of visual check by a user, by:

acquiring a second read image that is obtained by reading the printed matter on which the area is specified;

identifying the area based on the second read image, wherein the area is specified by a symbol assigned to the printed matter; and detecting the symbol on the second read image and identifying the area based on the symbol; and changing the threshold information to resolve the discrepancy in the area.

* * * * *